United States Patent Office 2,814,768
Patented Nov. 26, 1957

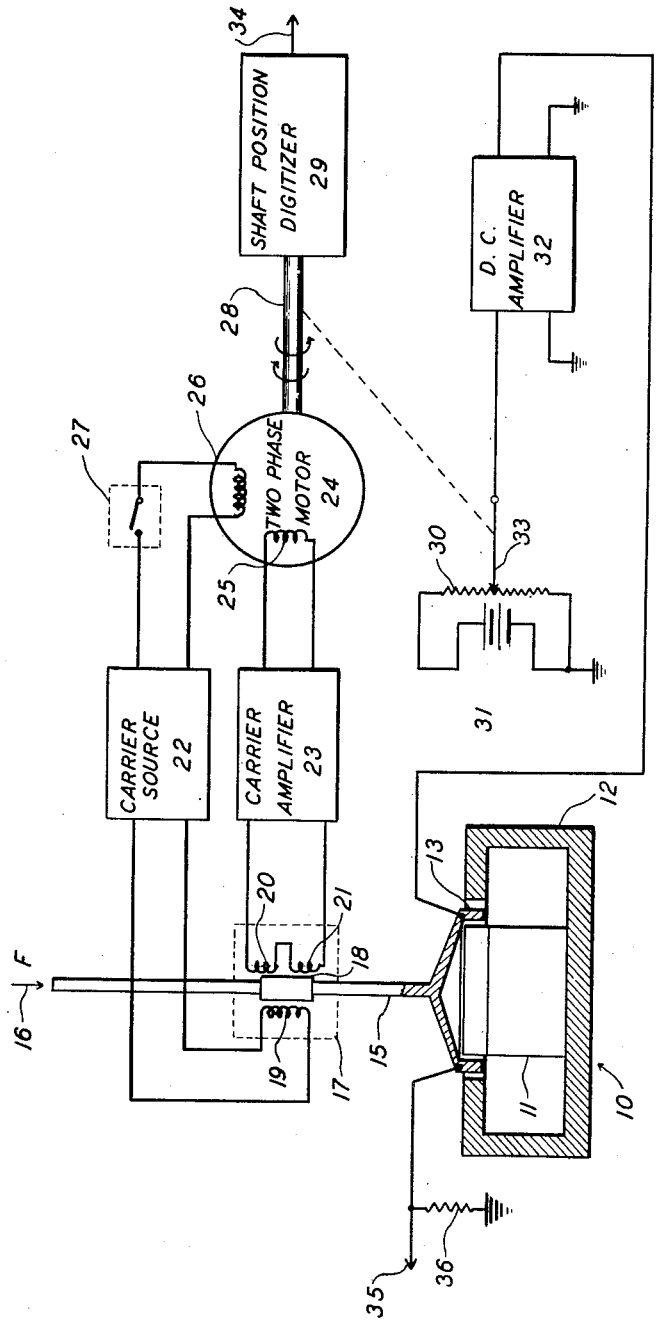

2,814,768
FORCE BALANCE SERVOSYSTEM
John F. Kinkel, Altadena, Calif., assignor, by mesne assignments, to Consolidated Electrodynamics Corporation, Pasadena, Calif., a corporation of California Application June 1, 1954, Serial No. 433,657

3 Claims. (Cl. 318—32)

This invention relates to measurement of force, pressure, and acceleration as accomplished with an electromagnetic balance and specifically to improvements in the circuitry associated with such a balance.

The conventional magnetic force balance is based upon the principle that the force exerted upon a conductor in a magnetic field is a function of the magnetic flux density and the electrical current in the conductor. Utilizing this principle, the force balance comprises a magnet, a driving coil connected to a displacement transducer and suspended in a magnetic field, means for applying a force which is a function of the parameter to be measured to the displacement transducer, and an electrical feedback loop including suitable amplification means connected between the transducer and the driving coil. The feedback loop varies the current in the driving coil in opposition to the transducer displacement, so that at equilibrium the opposing forces exerted on the moving system of the transducer by the force input and driving coil are equalized.

Normally, an output voltage developed in an output resistor by current flow in the coil is a measure of the applied force. The displacement transducer may comprise any of a number of conventional types such as for example a differential transformer, with the core of the transformer being mounted for displacement responsive to action of the force to be measured. Primary and secondary coils of the transformer are independently supported around the core so that application of a force displaces the core relative to the transformer windings.

If the force balance includes a transducer of the differential transformer type, a suitable carrier wave source is connected to the primary coil of the transformer and a suitable amplification network is connected between the secondary coils of the transformer and the driving coil of the balance for varying the current flow through the driving coil responsive to variations in the output of the transformer.

There is an ever growing demand at the present time for increasingly complex automatic and semi-automatic systems for rapid reduction of data. As a consequence, computing mechanisms, analog-digital converters, and memory devices of many different types have been developed. The high accuracy obtainable with new measurement techniques has necessitated the use of digital output presentation.

The magnetic force balance described above is an outstanding example of a transducer capable of extreme accuracy. With an electrical analog output accuracy of better than 0.1% of full scale, as in the case of this type of instrument, the need for digital output is readily apparent.

However, the requirements of digital data presentation and data storage facility have almost invariably resulted in the need for considerable equipment in excess of that normally required for the transducer operation alone. A typical analog-digital converter of the shaft positioning type, a stepping switch representing one embodiment of such a converter, requires its own complete servo channel for digitizing an electrical analog signal. Therefore, digitizing the output of an electromagnetic balance by conventional methods results in a system involving two separate servo channels, the servo loop employed to balance the displacement transducer and a second servo loop embodied in the converter.

The present invention is directed to a system for providing an analog shaft position output in a magnetic force balance without the need for an additional servo channel. By this expedient a considerable saving in complexity, size, and cost to achieve the desired digital output is realized.

The invention contemplates in a force balance including a displacement transducer and a driving coil, the combination comprising an amplifier to receive a signal from the transducer. This signal varies in amplitude in proportion to the displacement of the transducer. An electric motor is connected to be energized by the output of the amplifier whereby the motor output shaft position is a definite function of the electrical output of the transducer and hence the force input to the transducer. Means are provided operable responsive to the motor output shaft position to apply current to the driving coil approximately proportional to the time integral of the displacement of the transducer.

In the system above described, a single servo loop is made to replace two separate servo channels normally required to obtain the desired digital output.

Another feature of the invention is the simplicity of providing data storage means in the described system. For this purpose a two-phase A. C. motor or a D. C. shunt motor may be employed with the amplifier output supplying one source of energy to the motor, as to the control winding of a two-phase motor, and a reference power source supplying another source of energy as to the reference phase winding. By the simple expedient of removing the reference excitation from the motor, further rotation of the motor shaft as a function of excitation by the amplifier is prevented. In this manner, and by allowing the servo loop to attain steady state conditions in response to a quasi-static input force, the corresponding electrical and shaft position outputs are stored for an indefinite period by the de-energized motor. The storage stability attainable by this means is excellent since the fixed motor shaft position is unaffected by almost all external conditions encountered in practice.

As mentioned above, one conventional type of transducer usable in a magnetic force balance involves a differential transformer.

The invention will be more clearly understood by reference to the following detailed description taken in conjunction with the accompanying drawing which is a schematic diagram of a magnetic force balance system of the preferred form.

Referring to the drawing, a conventional magnetic force balance is shown as a portion of the system, the balance comprising a magnet structure 10 including a magnet core 11 and a yoke 12 defining an air gap with the core. A driving coil 13 is suspended in the air gap on the end of a balance shaft 15. The effective force F to be sensed is applied to the balance shaft as indicated by arrow 16. This effective force may be derived as a function of:

(1) A force;
(2) Pressure; and
(3) Acceleration.

The manner of applying a force as a function of any of the forcegoing parameters is well known in the art and forms no part of the present invention.

The force balance includes a displacement transducer 17 which, in the illustrated embodiment, takes the form of a differential transformer including a core 18, a primary coil 19, and secondary coils 20, 21.

A carrier source 22 is connected across the primary coil 19 of the differential transformer and a carrier amplifier 23 is connected to the secondary coils 20 and 21 of the transformer.

A two-phase motor 24 has a control winding 25 connected to the carrier amplifier 23 for excitation by the output of the amplifier. The motor has a reference phase winding at 26 connected to the carrier source 22 for energization by the carrier signal. A switch 27 is provided in the connection between the carrier source and the reference phase winding of motor 24 for the purpose hereinafter described. The motor 24 has an output shaft 28 which is rotated responsive to the excitation of the control and reference phase windings of the motor. The output shaft is connected to operate a shaft position digitizer or computing element 29. This element may take any of a number of well known forms, a simple mechanical rotary counter representing an example of such a device.

A slidewire potentiometer 30 is connected across a standard voltage source 31. A D. C. amplifier 32 is connected to tap 33 of the potentiometer, the tap being ganged as indicated to the output shaft 28 of motor 24 so that the position of the tap and hence the input to the D. C. amplifier 32 is a function of the position of the motor output shaft. The output of amplifier 32 is connected to the driving coil 13 of the magnet to provide a current flow in the coil proportional to the time integral of the electrical output of the transducer 17 and hence proportional to the displacement of the transducer. The system provides a digital output at 34 representing the output of the shaft position digitizer and an analog output at 35 developed responsive to a voltage drop across a resistor 36 connected in the circuit of driving coil 13.

The operation of the apparatus illustrated in the figure is as follows: A force applied at 16 tends to displace transformer core 18 and driving coil 13. Displacement of the core 18 results in a variation in the output of transformer 17. A signal is applied to the carrier amplifier which varies in magnitude from the output of the carrier source. With switch 27 closed (as shown) these two signals are applied respectively across the control winding and reference phase winding of the two-phase motor, the voltage difference resulting in a rotation of the motor output shaft 28. Rotation of the shaft varies the setting of contact 33 on potentiometer 30 in such a direction as to feed a voltage to the D. C. amplifier, which voltage is amplified and fed to the driving coil 13 to buck the force applied at 16 and restore the core 18 to its nominal position. Restoration of the core balances the output of carrier amplifier 24 with the carrier source 23 with the result that the motor is no longer energized. The angular displacement of the motor output shaft necessary to bring about such balancing operation is utilized in the shaft position digitizer 29 to produce a digital output at 34. At the same time an analog output is obtained at 35 as a function of the current flow in driving coil 13.

If it is desired to store any given information in the system, the motor can be de-energized at any desired time by opening switch 27. Such storage may be useful when the balance is employed to measure a quasi-static input force. When a balance has been reached in the system responsive to the application of such a force, switch 27 can be opened and the motor is thereby rendered insensitive to any subsequent change in the force since there will be no signal applied to the reference phase winding from the carrier source.

In the foregoing description it is apparent that rotation of the motor output shaft is a definite function of the electrical analog output and hence of the force input. A wide variety of functions relating shaft position and electrical output to force input can be obtained so that it is possible to perform certain computing functions within the electromagnetic balance servo loop. The shaft position output can be made proportional to input force so that by coupling the output shaft to a simple shaft position digitizer a direct reading digital output is obtained. Additionally, the output shaft position can be made proportional to the square root of the force input for quasi-static condition. These and other variations in the functionality between the shaft position and the input force may be obtained by a variation of the transfer function of D. C. amplifier 32 or by variation of the electrical characteristics of the feedback potentiometer 30.

I claim:

1. In a force balance including a displacement transducer adapted to develop an electrical output signal as a function of its displacement and a driving coil adapted to oppose such displacement, the combination comprising an amplifier connected to receive and amplify the transducer output signal, a reversible electric motor, means coupling the motor to the output of the amplifier for causing the motor to rotate in accordance with the phase and the amplitude of the signal provided at the output of the amplifier, first means responsive to rotation of the motor shaft for applying an electric current to the driving coil of the force balance to oppose displacement of the transducer of the force balance, and second means responsive to rotation of the motor shaft for simultaneously providing a digital representation of the rotation of the motor shaft.

2. In a force balance including a displacement transducer adapted to develop an electrical output signal as a function of its displacement and a driving coil adapted to oppose such displacement, the combination comprising an amplifier connected to receive and amplify the transducer output signal, a two-phase electric motor, means for coupling one phase of the motor to a source of alternating current, means coupling the other phase of the motor to the output of the amplifier for causing the motor to rotate in accordance with the phase and the amplitude of the signal provided at the output of the amplifier, first means responsive to rotation of the motor shaft for applying an electric current to the driving coil of the force balance to oppose displacement of the transducer of the force balance, second means responsive to rotation of the motor shaft for simultaneously providing a digital representation of the rotation of the motor shaft, and means for de-energizing one phase winding of the motor so that the digital information which is produced at any selected instant of time may be retained.

3. In a force balance including a displacement transducer adapted to develop an electrical output signal as a function of its displacement and a driving coil adapted to oppose such displacement, the combination comprising a carrier amplifier connected to receive and amplify the transducer output signal, a two-phase electric motor, means coupling the motor to the output of the carrier amplifier for causing the motor to rotate in accordance with the phase and the amplitude of the signal provided at the output of the carrier amplifier, an adjustable potentiometer responsive to rotation of the motor shaft for providing an electric signal in accordance with the rotation of the motor shaft, a direct current amplifier having its input coupled to receive the electric signal produced by the potentiometer and having its output coupled to the driving coil of the force balance for applying an electric current to the driving coil of the force balance to oppose displacement of the transducer of the force balance, and means responsive to rotation of the motor shaft for simultaneously providing a digital representation of the rotation of the motor shaft.

References Cited in the file of this patent

UNITED STATES PATENTS

| | | |
|---|---|---|
| 1,855,205 | Schur | Apr. 26, 1932 |
| 2,114,857 | Peterson | Apr. 19, 1938 |
| 2,117,894 | Lenehan | May 17, 1938 |
| 2,293,730 | Gutmann | Aug. 25, 1952 |
| 2,620,665 | Carlisle et al. | Dec. 9, 1952 |
| 2,706,812 | Dinlocker | Apr. 19, 1955 |

OTHER REFERENCES

Automatic Calibration of Transducers, Kinkel and Mawson, "Instruments," vol. 26, p. 1526, October 1953.